C. G. FRASH.
Apparatus for Charging, Purifying, and Filling out Beer.
No. 220,368. Patented Oct. 7, 1879.
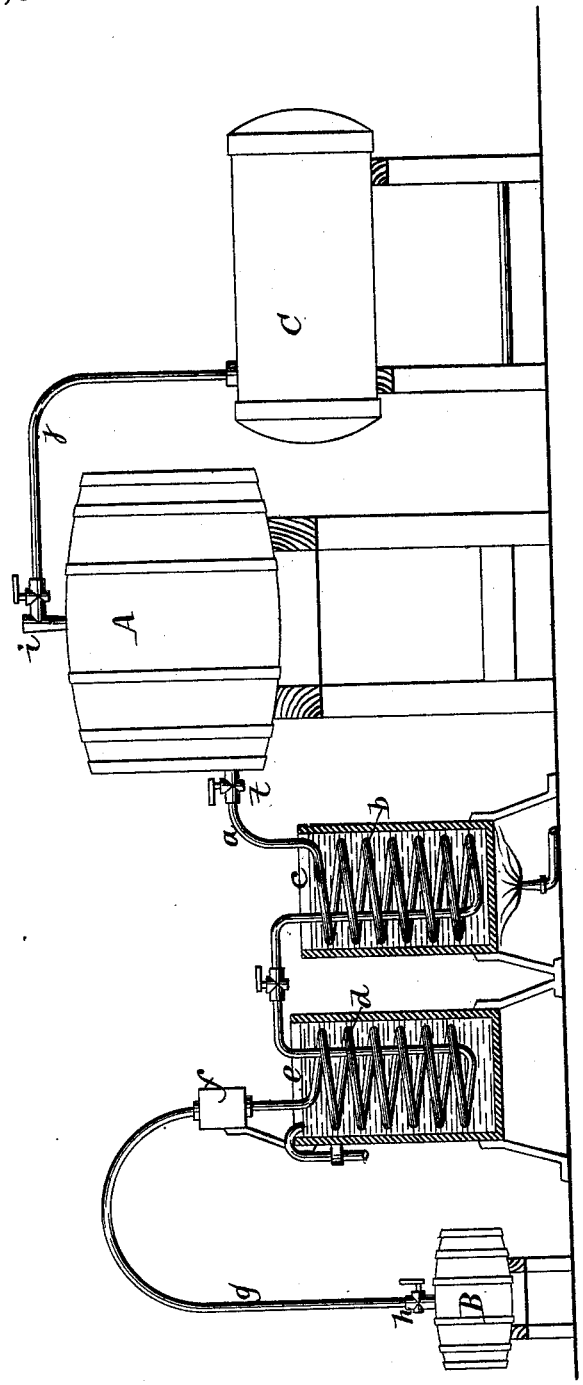
Witnesses.
Chas. Wahlers.
Wm Miller.
Inventor:
Christian G. Frash
by his attys
Van Santvoord & Hauff

UNITED STATES PATENT OFFICE.

CHRISTIAN G. FRASH, OF HOBOKEN, NEW JERSEY.

IMPROVEMENT IN APPARATUS FOR CHARGING, PURIFYING, AND FILLING OUT BEER.

Specification forming part of Letters Patent No. 220,368, dated October 7, 1879; application filed January 10, 1879.

*To all whom it may concern:*

Be it known that I, CHRISTIAN G. FRASH, of Hoboken, in the county of Hudson and State of New Jersey, have invented a new and Improved Process for Bottling and Filling Out Beer and other Liquids, which invention is fully set forth in the following specification, reference being had to the accompanying drawing, which represents a longitudinal section of an apparatus which may be used in carrying out my invention.

It is a well-known fact that beer and other fermented liquids, after their fermentation has been completed, still contain germs of fermentation, which, under favorable circumstances, produce a second fermentation, whereby the liquid is rendered useless for the purpose for which it was originally intended. In order to overcome this difficulty it is a common practice, in bottling beer, to fill the beer into the bottles and then heat the bottles, together with the beer, to about 170° Fahrenheit, so as to destroy all germs of fermentation after the bottles are corked or closed. This process, however, requires much time, and the impurities which remain in the beer are liable to render the same dull in appearance and to impair its taste.

Beer has also heretofore been prepared for bottling by passing it through a heater, thence through a cooler, from which it passes to a chamber, where it is impregnated with carbonic-acid gas, and whence, by the pressure of the gas, it is forced through a filter.

My invention consists in the combination, with a closed vessel for containing beer, of a carbonic-acid-gas generator connected directly therewith, a heater, also connected directly with said beer-vessel, a cooler connected with said heater, and a filter connected with the cooler, and to be connected with a beer cask or bottle, whereby the beer is first subjected to pressure of the carbonic-acid gas, being impregnated therewith and forced thereby into the heater, for the purpose of arresting fermentation, and through the cooler and filter and connections, and into the storing-chamber. The pressure of the gas is thus utilized both for impregnating the beer and forcing it through the several parts of the apparatus. The beer thus-prepared retains its flavor for a long time, and it is not liable to become sour or spoiled by changes in the temperature.

In filling out beer from a cask, A, into a keg, B, for instance, I proceed as follows: I tap the cask, and to its tap $t$, I connect a tube or hose, $a$, which communicates with a coil, $b$, immersed in a water-bath, $c$, the temperature of which is maintained at about 200° Fahrenheit. The discharge end of the coil $b$ connects with a coil, $d$, situated in a vessel or tank, $e$, which is filled with cold water, the temperature of which is maintained at about 50° Fahrenheit by ice or by passing through the tank a continuous current of cold water, or by both these means combined. The discharge end of the cooling-coil $d$ connects with a filter, $f$, from which extends a pipe or hose, $g$, to a spigot, $h$, inserted into the keg B.

In order to raise the pressure in the cask A to the desired point, I secure in the same a spigot, $i$, which connects by a tube or hose, $j$, with an apparatus, C, for generating carbonic-acid gas.

When the tap $t$ of the cask A is open, the beer runs first through the heating-coil $b$, then through the cooling-coil $d$, then through the filter $f$, before it reaches the keg B. By regulating the flow of the beer the temperatures which it assumes in passing through the heating and the cooling coils can be regulated.

By these means the beer which reaches the keg B is free from active germs of fermentation and from other impurities, and after the keg has been filled and closed it can be shipped to any distance and exposed to high or low temperatures without danger of spoiling it or of reducing its marketable value.

If it is desired to fill the beer from the cask or keg into bottles, the pipe or hose $g$, which extends from the filter $f$, is connected to the head of an ordinary bottling-machine, and the beer is run into bottles in the manner usually practiced, under the pressure of carbonic-acid gas.

It is obvious that my process is applicable to bottling or filling out other liquids besides beer.

What I claim as new, and desire to secure by Letters Patent, is—

The combination, with a closed vessel for containing beer, of a carbonic-acid-gas generator connected directly therewith and leading to the same, a heater, also connected directly with said beer-vessel and leading from the same, a cooler connected with and following said heater, and a filter connected with and following the cooler, substantially as described, whereby the beer to be prepared is first subjected to pressure of carbonic-acid gas, impregnated therewith, and forced thereby into the heater, for the purpose of arresting fermentation, and through the cooler and filter and connections, and into the storing-vessel, the pressure of the gas being thus utilized for both impregnating the beer and forcing it through the several parts of the apparatus.

In testimony that I claim the foregoing I have hereunto set my hand and seal this 7th day of January, 1879.

CHRISTIAN G. FRASH. [L. S.]

Witnesses:
W. HAUFF,
CHAS. WAHLERS.